(12) United States Patent
Munevar

(10) Patent No.: US 10,429,154 B2
(45) Date of Patent: Oct. 1, 2019

(54) ENERGY WEAPON HAVING A FAST START TURBINE FOR A HIGH POWER GENERATOR

(71) Applicant: Rolls-Royce North American Technologies, Inc., Indianapolis, IN (US)

(72) Inventor: Erik A. Munevar, Indianapolis, IN (US)

(73) Assignee: Rolls-Royce North American Technologies Inc., Indianapolis, IN (US)

(*) Notice: Subject to any disclaimer, the term of this patent is extended or adjusted under 35 U.S.C. 154(b) by 421 days.

(21) Appl. No.: 15/250,471

(22) Filed: Aug. 29, 2016

(65) Prior Publication Data
US 2018/0058336 A1   Mar. 1, 2018

(51) Int. Cl.
| | |
|---|---|
| F41H 13/00 | (2006.01) |
| H02K 7/18 | (2006.01) |
| F02C 7/268 | (2006.01) |
| F02C 9/44 | (2006.01) |
| F02C 9/26 | (2006.01) |
| F02C 7/36 | (2006.01) |
| F01D 19/00 | (2006.01) |
| F02C 7/275 | (2006.01) |
| F01D 15/10 | (2006.01) |

(52) U.S. Cl.
CPC ......... *F41H 13/0043* (2013.01); *F01D 19/00* (2013.01); *F02C 7/268* (2013.01); *F02C 7/275* (2013.01); *F02C 7/36* (2013.01); *F02C 9/26* (2013.01); *F02C 9/44* (2013.01); *H02K 7/1823* (2013.01); *F01D 15/10* (2013.01); *F05D 2260/42* (2013.01); *Y02T 50/671* (2013.01)

(58) Field of Classification Search
CPC .... F41H 13/0043; F41H 13/005; F02C 7/268; F02C 7/36; F02C 9/26; F02C 7/275; F02C 9/44; F01D 19/00
See application file for complete search history.

(56) References Cited

U.S. PATENT DOCUMENTS

| | | | |
|---|---|---|---|
| 3,151,250 A | 9/1964 | Carlson | |
| 6,378,285 B1 | 4/2002 | Blatter et al. | |
| 7,285,871 B2* | 10/2007 | Derouineau | F02C 9/26 290/52 |
| 8,362,884 B2* | 1/2013 | Duge | F41H 13/00 250/492.1 |
| 8,590,317 B2 | 11/2013 | Davies et al. | |
| 2010/0308765 A1* | 12/2010 | Moore | H02J 7/0013 320/103 |
| 2010/0326086 A1 | 12/2010 | Khosid et al. | |
| 2011/0259016 A1 | 10/2011 | Winston et al. | |
| 2012/0180496 A1 | 7/2012 | Fletcher et al. | |
| 2012/0285175 A1 | 11/2012 | Fletcher et al. | |
| 2014/0026538 A1 | 1/2014 | Hauser et al. | |

* cited by examiner

*Primary Examiner* — Steven M Sutherland
*Assistant Examiner* — Thuyhang N Nguyen
(74) *Attorney, Agent, or Firm* — Barnes & Thornburg LLP

(57) ABSTRACT

A system platform includes a gas turbine engine coupled to a high power generator. The high power generator, driven by the gas turbine engine, supplies power to high power subsystems of the platform.

8 Claims, 3 Drawing Sheets

ENERGY WEAPON HAVING A FAST START TURBINE FOR A HIGH POWER GENERATOR

FIELD OF THE DISCLOSURE

The present disclosure relates generally to energy weapon systems with gas turbine engines used for power generation.

BACKGROUND

Energy weapons such as lasers, masers, particle accelerators, and the like use energy to create high energy beams. Such weapons can become stand-alone systems when used in conjunction with dedicated power generators. Fuel-burning engines, such as gas turbine engines, can be part of these power generators.

Gas turbine engines are used to power aircraft, watercraft, electrical generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Exhaust products of the combustion reaction in the combustor are directed into the turbine where work is extracted to drive the compressor and, sometimes, an output shaft, fan, or propeller.

In power generation applications, the gas turbine engine is mechanically linked to a "main" generator to turn the generator and produce electricity. When power from the main generator is not needed, the engine is shut off to conserve fuel. Re-starting of the engine is a time consuming process and can delay the generation of power when needed.

SUMMARY

The present disclosure may comprise one or more of the following features and combinations thereof.

According to an aspect of the present disclosure, a weapon system platform may include a high-energy beam unit, a gas turbine engine configured to provide power for the high-energy beam unit, a generator, and an energy storage unit. The high-energy beam unit may be configured to discharge high-energy beams. The gas turbine engine may include a first shaft coupled to a compressor and a high pressure turbine rotor, a second shaft concentric with and independently rotatable relative to the first shaft and coupled to a low pressure turbine rotor, a starter adapted to rotate the first shaft, and a combustor adapted to combine air received from the compressor with fuel and to burn the fuel to supply high pressure gasses toward the high pressure turbine rotor and low pressure turbine rotor to rotate the first and second shafts.

In illustrative embodiments, a generator control system may be configured to selectively operate the starter and to selectively deliver fuel to the combustor such that the first shaft is continuously rotated by at least one of the starter and high pressure gasses from the combustor and the second shaft is selectively rotated by high pressure gasses from the combustor.

In illustrative embodiments, fuel may be selectively delivered to the combustor when an amount of electricity stored in the energy storage unit is below a threshold level.

In illustrative embodiments, fuel may be selectively delivered to the combustor when a power demand signal is received by the generator control system.

In illustrative embodiments, a load shaft gearbox may be coupled to the second shaft and the generator. The load shaft gearbox may be configured to transfer rotation of the second shaft to the generator.

In illustrative embodiments, the energy storage unit may be a high power energy storage unit configured to power the high-energy beam unit. The generator may be a high power generator configured to produce electricity to charge the high power energy storage unit during operation of the high-energy beam unit.

In illustrative embodiments, fuel may be selectively delivered to the combustor when the high-energy beam unit is operated.

In illustrative embodiments, a low power generator may be coupled to the load shaft gearbox and configured to generate electricity when driven by the gas turbine engine. A low power energy storage unit may be coupled to the low power generator and may be configured to store the electricity generated by the low power generator.

In illustrative embodiments, the starter may be electrically connected to the low power energy storage unit.

According to another aspect of the present disclosure, a method of operating a weapon system platform may include rotating a generator with a gas turbine engine to produce electricity, storing the electricity produced by the generator in an energy storage unit, and selectively providing electricity from the energy storage unit to a high-energy beam unit to cause an energized beam to be discharged.

In illustrative embodiments, the method may further include selectively supplying fuel to the gas turbine engine and continuously rotating the gas turbine engine when fuel is not supplied to the gas turbine engine to minimize a start time of the gas turbine engine when fuel is selectively supplied to the gas turbine engine.

In illustrative embodiments, the method may further include continuously rotating a first shaft of the gas turbine engine by at least one of selectively operating a starter of the gas turbine engine and selectively delivering fuel to a combustor of the gas turbine engine, the first shaft coupled to a compressor and a high pressure turbine rotor, and selectively rotating a second shaft of the gas turbine engine by selectively delivering fuel to the combustor, the second shaft concentric with and independently rotatable relative to the first shaft and coupled to a low pressure turbine rotor.

In illustrative embodiments, fuel may be selectively delivered to the combustor when an amount of electricity stored in the energy storage unit is below a threshold level.

In illustrative embodiments, fuel may be selectively delivered to the combustor when a power demand signal is received by the generator control system.

In illustrative embodiments, a load shaft gearbox may be coupled to the second shaft and the generator. The load shaft gearbox may be configured to transfer rotation of the second shaft to the generator.

In illustrative embodiments, the energy storage unit may be a high power energy storage unit configured to power the high-energy beam unit. The generator may be a high power generator configured to produce electricity to charge the high power energy storage unit during operation of the high-energy beam unit.

In illustrative embodiments, fuel may be selectively delivered to the combustor when the high-energy beam unit is operated.

In illustrative embodiments, a low power generator may be coupled to the load shaft gearbox and may be configured to generate electricity when driven by the gas turbine engine. A low power energy storage unit may be coupled to the low power generator and configured to store the electricity generated by the low power generator.

In illustrative embodiments, the starter may be electrically connected to the low power energy storage unit.

These and other features of the present disclosure will become more apparent from the following description of the illustrative embodiments.

DETAILED DESCRIPTION OF THE DRAWINGS

Figure 1:
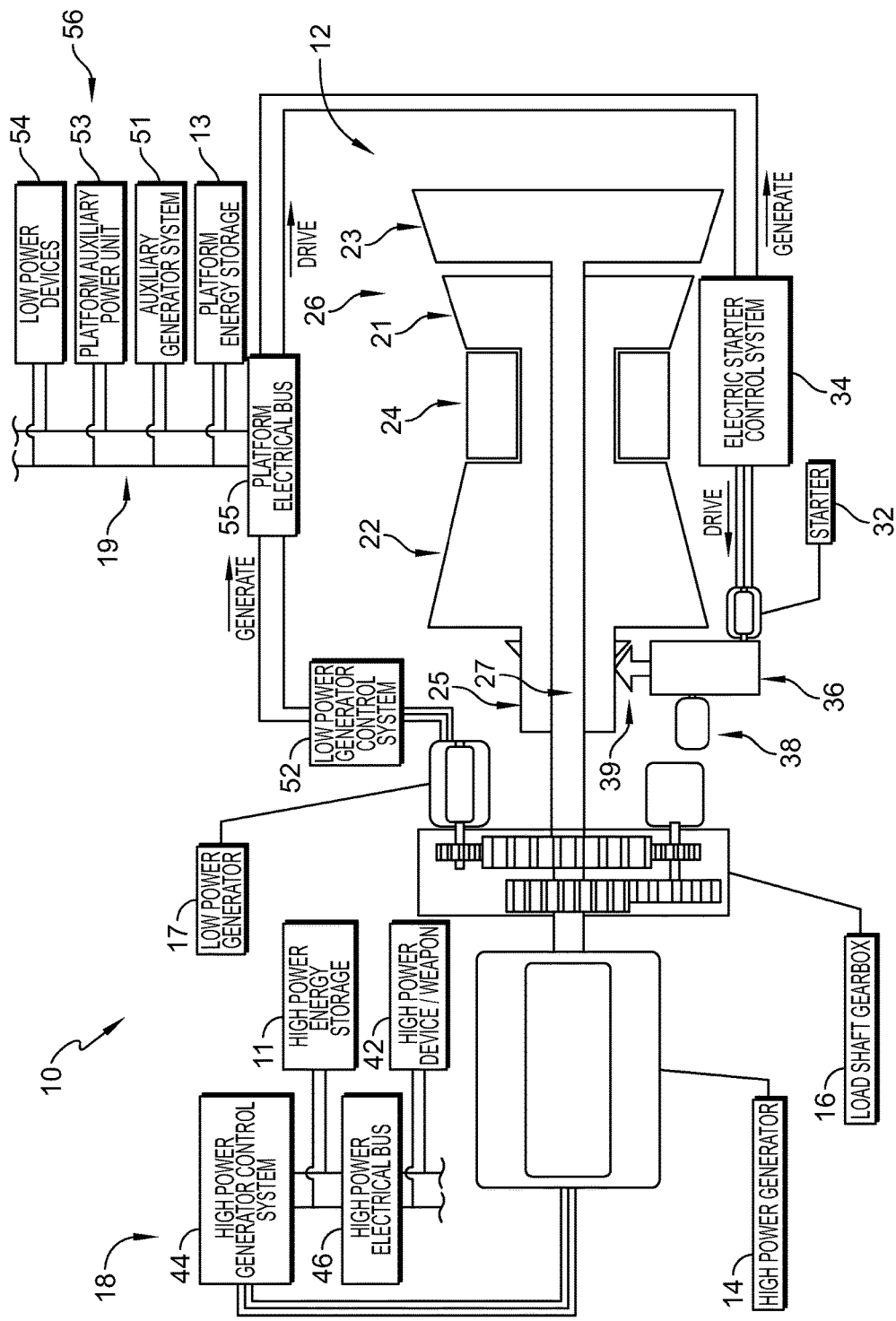
FIG. 1 is a is a diagrammatic view of an energy weapon system platform having a gas turbine engine used to drive a generator for producing power to be stored for later use and suggesting that a starter of the engine is engaged with a main shaft of the engine to turn the engine.

For the purposes of promoting an understanding of the principles of the disclosure, reference will now be made to a number of illustrative embodiments illustrated in the drawings and specific language will be used to describe the same.

An energy weapon system platform 10 with a gas turbine engine 12 is shown, partially diagrammatically, in FIG. 1. The system platform 10 includes a high power device or weapon 42 that produces high energy beams using power generated by the gas turbine engine 12. In illustrative embodiments, the high power device 42 may be a high-energy beam unit, such as a laser, maser, particle accelerator, or the like so that a stand-alone energy weapon system is provided. In other embodiments, the system platform 10 may include non-weaponized high power devices 52 without departing from the spirit of this disclosure.

As shown in FIG. 1, the illustrative system platform 10 includes the gas turbine engine 12 coupled to a high power generator 14 by a load shaft gearbox 16. The high power generator 14 supplies power to high power subsystems 18 of the platform 10. A low power generator 17 is also coupled to load shaft gearbox 16 to provide power for low power subsystems 19 of the platform 10. The gas turbine engine 12 drives the gearbox 16 to turn the high power and low power generators 14, 17 to produce electricity for the platform 10. The produced electricity can be stored in energy storage units 11, 13 for later use. When energy production is not required, a supply of fuel to the engine 12 is stopped, and rotation of the engine 12 is continued using another energy source, such as a starter 32 of the engine 12, to allow the engine 12 to rapidly start with the re-application of fuel.

The gas turbine engine 12 includes a compressor 22, a combustor 24, and a turbine 26 having a high pressure (HP) turbine rotor 21 and a low pressure (LP) turbine rotor 23 as shown in FIG. 1. Air is drawn into the compressor 22 which compresses and delivers the air to the combustor 24. The combustor 24 mixes fuel with the compressed air from the compressor 22 and combusts the mixture. The hot, high-pressure exhaust products of the combustion reaction in the combustor 24 are directed into the turbine 26 to cause rotation of the HP and LP turbine rotors 21, 23.

The compressor 22 and HP turbine rotor 21 are connected to a high pressure (HP) shaft 25 and rotate together as suggested in FIG. 1. The LP turbine rotor 23 is coupled to a low pressure (LP) shaft 27 which rotate together. The HP and LP shafts 25, 27 are rotatable independent of one another. The compressor 22, combustor 24, and HP turbine rotor 21 cooperate to run the gas turbine engine 12 while the hot, high-pressure exhaust products from the combustor 24 rotate the LP turbine rotor 23 and LP shaft 27 to drive the generators 14, 17.

A starter 32 of the engine 12 is controlled by an electric starter control system 34 as suggested in FIG. 1. The starter 32 is configured to rotate the HP shaft 25 and start the engine 12 by pre-compressing air for combustion in the combustion chamber 24 during "light-off." In the illustrative embodiment, the starter 32 is coupled to an accessory gearbox 36 which engages with the HP shaft 25 through a bevel gear 39. One or more additional engine accessories 38 can be connected to the accessory gearbox 36, such as oil pumps for example, to run the accessories during starting of the engine 12 and while the engine 12 is running. One or more additional engine accessories 38 can also be connected to the load shaft gearbox 16.

Figure 3:
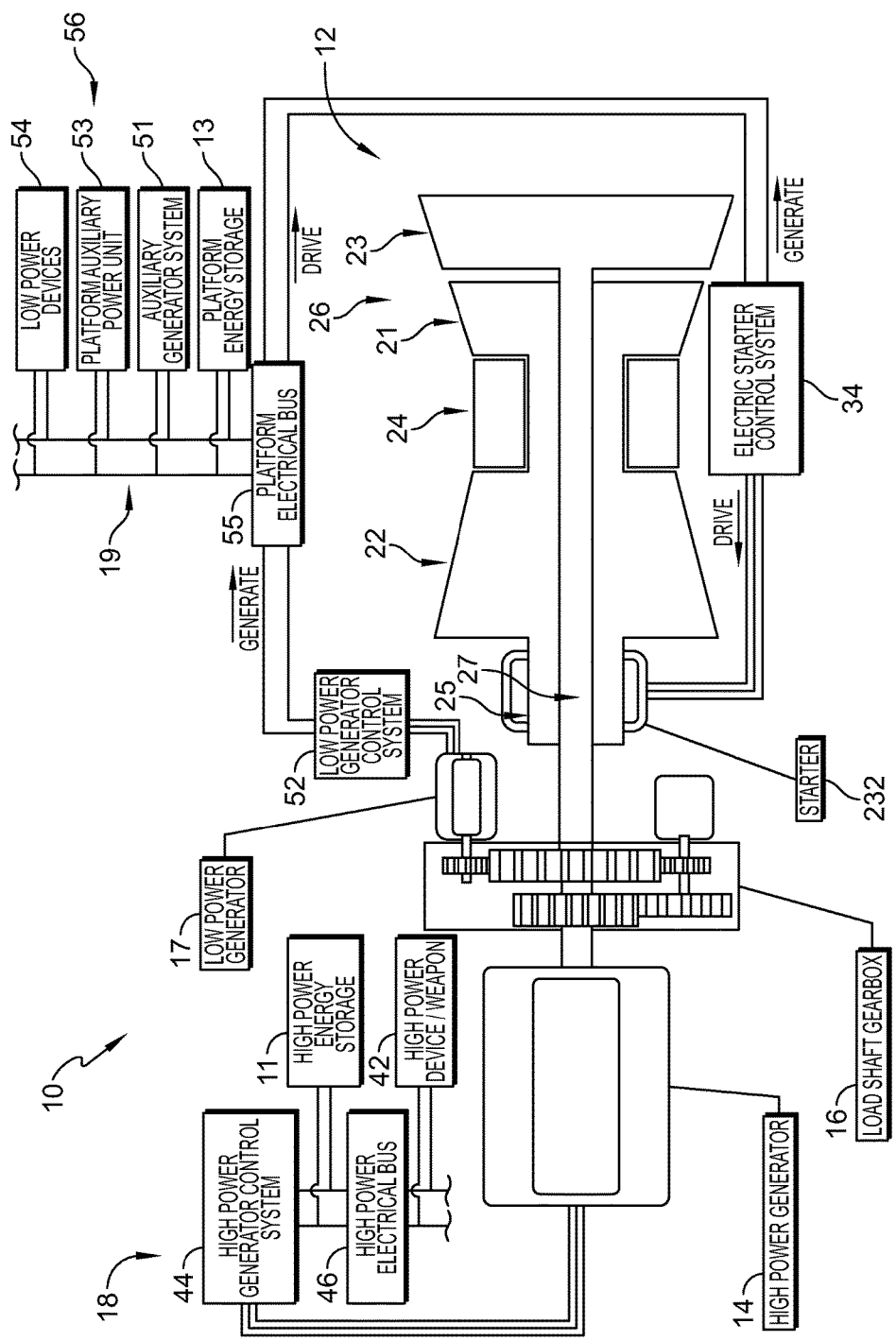
FIG. 3 is a view similar to FIG. 1 showing a starter of the engine integrated with a shaft of the engine.

In some embodiments, a starter 232 is integrated with the HP shaft 25 as suggested in FIG. 3. The starter 232 is used to start the engine 12 and acts as a generator while the engine 12 is running similar to the starter 32 of FIG. 1. In some embodiments, rotor components of the starter 232, such as magnets or rotor windings, are integrated with the HP shaft 25.

A high power generator control system 44 is used to monitor the high power energy storage unit 11 and a high power weapon or device 42 as suggested in FIG. 1. Energy stored in the high power energy storage unit 11 is supplied through a high power electrical bus 46 to the high power device 42 or other high power needs of the platform 10. High power generator control system 44 can control operation of the engine 12 to maintain a level of stored energy in the high power energy storage unit 11 above a threshold level and to supply power during operation of the high power device 42. In some embodiments, the high power energy storage unit 11 is a battery, capacitor, other energy storage device, or combination thereof.

A low power generator control system 52 is used to monitor the platform energy storage unit 13 and other low power subsystems 19 of the platform 10 as suggested in FIG. 1. In the illustrative embodiment, a platform electrical bus 55 connects low power devices 54 of the platform 10, such as sensors and communication devices, with the platform energy storage unit 13 to supply energy for the low power devices 54. Low power generator control system 52 can control operation of the engine 12 to maintain a level of stored energy in the platform energy storage unit 13 above a threshold level and to supply power during operation of the low power device 54. In some embodiments, the low power generator 17 supplies energy to the platform energy storage unit 13 during operation of the engine 12. Starter 32 is driven by engine 12 to supply energy to various components of the engine 12. Alternatively or in combination with the starter 32, the low power generator 17 can supply energy to the engine 12 components.

In some embodiments, external energy sources 56 are used to maintain a threshold level of power in the platform energy storage unit 13 as suggested in FIG. 1. External energy sources can include an auxiliary generator system 51, such as an internal combustion engine powered generator or another gas turbine engine powered generator, and to a platform auxiliary power unit 53, such as a local power grid, for example. In some embodiments, platform 10 is stationary and is coupled the platform auxiliary power unit 53. The platform auxiliary power unit 53 can be used to maintain a threshold level of power in both energy storage units 11, 13 during idle of the engine 12. In some embodiments, the platform 10 is designed to be a self-sustaining unit which can operate independent of a local power grid or other external power source so long as fuel is supplied to the engine 12. The auxiliary generator system 51 can be used to maintain a threshold level of power in both energy storage units 11, 13 during idle of the engine 12.

Figure 2:
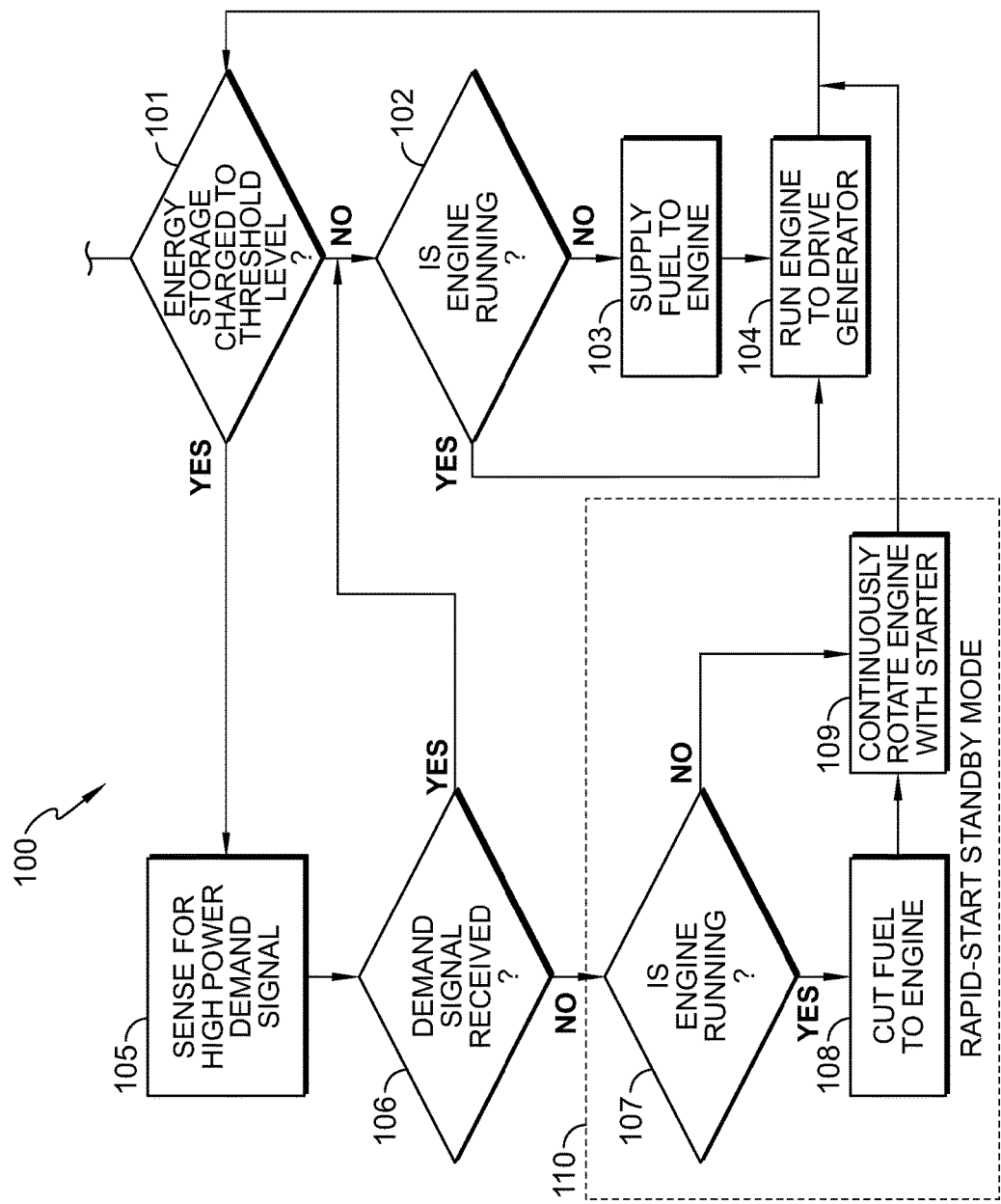
FIG. 2 is a diagrammatic view of a process for on-demand power generation using the gas turbine engine of FIG. 1 showing that the engine is placed in a rapid-start standby mode when a threshold amount of energy is stored and no energy demand from high power platform subsystems is sensed.

An illustrative process 100 for operating the platform 10 in accordance with the present disclosure is shown in FIG. 2. The process starts at 101, at which a check of energy storage levels is conducted to determine if they are above a threshold level. In some embodiments, the threshold energy storage level is based on the performance characteristics of the energy storage units 11, 13, the power requirements of the high power device 42 and other high power subsystems 18 of platform 10, the power requirements of the low power devices 54 and other low power subsystems 19 of platform 10, the availability of an auxiliary generator system 51, and the availability of a platform auxiliary power unit 53. If there is not an amount of energy stored above the threshold level, a check of whether the gas turbine engine 12 used to drive the high power generator 14 is running or not is conducted as suggested at 102. If the engine 12 is not already running, fuel is supplied to the engine 12 to start the engine as suggested at 103, and the engine 12 drives the high power generator 14 to supply power to the energy storage units 11, 13 as suggested at 104.

Once a threshold level of energy storage is reached, high power generator control system 44 senses for a high power demand signal as suggested at 105 in FIG. 2. In some embodiments, the high power demand signal is based on a signal to begin operation of the high power device 42. The amount of power used during operation of the high power device 42 can rapidly deplete the energy stored in the high power energy storage unit 11 requiring the additional input of energy to continue operation of the high power device 42. In some embodiments, the high power demand signal is based a signal from one or more of the low power devices 54, such as a sensor reading or communication received by the platform 10, which provides an indication that high power device 42 is likely about to be used. If a demand signal is received, as suggested at 106, then the engine 12 is run to drive the generator 14 and supply power as suggested at 102-104.

If no demand signal is received, a check of whether the gas turbine engine 12 used to drive the high power generator 14 is running or not is conducted as suggested at 107. If the engine 12 is running, fuel is cut from the engine 12, as suggested at 108, and the engine 12 is continuously rotated by the starter 32 as suggested at 109 as part of a rapid-start standby mode 110. The rapid-start standby mode 110 allows engine 12 to start with just the application of fuel to that the engine 12 can begin to drive the generator 14 and supply power "on demand" as power is needed. Rapid starting of the engine 12 allows for the total amount of energy storage units to be minimized and reduce the weight, size, etc. of the platform 10.

In the rapid-start standby mode 110, the HP shaft 25 is driven by the starter 32 and rotates independent of the LP shaft 27 as suggested in FIGS. 1 and 2. Compression of air by the compressor 22 and expansion through turbine 26 during rotation of the HP shaft 25 keeps the components of the engine 12 at an elevated temperature to minimize thermal shock to the engine 12 on startup. With the engine 12 turning and heated, supplying fuel to the combustor 24 allows the engine 12 to start and produce power rapidly.

In gas turbine engines (such as engine 12), mechanical power is transferred from turbines (such as turbine 26) to compressors (such as compressor 22) through shaft and spline systems (such as HP and LP shafts 25, 27), with bearings providing axial and radial positioning of the rotating components. A central shaft (which may be referred to as a "main" shaft, a "main drive," or a "mainline" shaft, for example) typically links the turbine 26 and compressor sections 22 of the turbine engine 12. In turbine engines 12 having multiple turbine 21, 23 and compressor sections 22, there may be multiple, concentric, independently rotatable shafts 25, 27. For example, a high pressure (HP) shaft 25 may link a high pressure compressor 22 with a high pressure turbine 21, while a low pressure (LP) shaft 27 links a fan or other mechanical output, such as a "main" generator 17, with a low pressure turbine 23. The low pressure shaft 27 may be concentric with and disposed within the high pressure shaft 25.

During operation, the gas turbine engine 12 drives a generator 17 to supply power for accessories and subsystems 18 of the associated platform 10. Typical engine accessories (i.e., 38) include an engine control unit, a starter 32, fuel pumps, oil pumps, etc. In order to extract power from the turbine engine 12 to drive these accessories and subsystems, one or more mechanical or electrical "accessory" drives (i.e., 36) transmit power from the mainline shafts to a starter 32 of the engine 12. The starter 32 is used to turn the engine 12 when activated, such as when starting the engine, and generate power when idle. For example, a bevel gear 39, alone or in combination with other components (such as a stub shaft, idler, spur gears and splines), may be driven by a mainline shaft (i.e., 25). The bevel gear 39 may drive an accessory gearbox 36, which in turn rotates the starter 32 to provide power to the engine accessories 38.

The system platform 10 is generally a self-contained unit which can operate without input from external power sources if needed. In some embodiments, the platform 10 is a stationary unit which can be integrated with a power grid such that the gas turbine engine generator is only needed during outages of the power grid. In some embodiments, the platform 10 is a mobile unit which can be integrated into an air, land, or water based vehicle, for example. The vehicle generally includes a main drive used to power and move the vehicle, and the gas turbine engine generator is used to power various subsystems requiring additional power.

In illustrative embodiments, the system platform 10 of the present disclosure is used for operating a high power weapon or other device 42 which consumes large amounts of electricity on-demand. One example is a directed energy weapon, such as a laser. The high power device 42 is connected to energy storage units 11 of the platform 10 which are maintained by the gas turbine engine generator with a threshold amount of power to operate the high power device 42. For example, the energy storage units 11 can include sufficient capacity for short-term, continued operation of the high power device 42, or multiple pulsed operations before being depleted. The gas turbine generator is used to resupply the energy storage units 11 to allow further use of the high power device 42.

The gas turbine engine generator can be placed in an "idle" state during extended periods of non-use of the high power device 42. The gas turbine engine generator cycles on and off to maintain the energy storage units 11, 13 above a threshold level. However, due to the on-demand nature of the high power device 42, the gas turbine engine generator needs to be started rapidly in order to keep the high powered device 42 supplied with energy.

In illustrative embodiments of the present disclosure, the gas turbine engine 12 is placed in a rapid-start standby mode 110 to allow the engine 12 to start very quickly, such as on the order of less than 30 seconds. Typically, a gas turbine engine 12 requires several minutes to go through a startup operation before supplying power, and a high power device 42 may deplete the stored energy before additional power is available. The rapid-start standby mode 110 of the present disclosure maintains the engine 12 in a rotating condition such that the engine 12 can start with just the addition of fuel and supply power to the high power device 42 on-demand. The rapid-start standby mode 110 conserves fuel while allowing for extended use of the high power device 42 and without adding large and heavy banks of energy storage units. Limiting size and weight is especially important in mobile vehicles, such as aircraft, where weight savings can greatly impact overall performance of the system. Smaller systems also allow a greater range of placement options for stationary platforms, such as the roof of a building.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A weapon system platform comprising:
   a high-energy beam unit configured to discharge high-energy beams,
   a gas turbine engine configured to provide power for the high-energy beam unit, the gas turbine engine including a first shaft coupled to a compressor and a high pressure turbine rotor, a second shaft concentric with and independently rotatable relative to the first shaft and coupled to a low pressure turbine rotor, a starter adapted to rotate the first shaft, and a combustor adapted to combine air received from the compressor with fuel and to burn the fuel to supply high pressure gasses toward the high pressure turbine rotor and low pressure turbine rotor to rotate the first and second shafts,
   a generator coupled to the second shaft of the gas turbine engine and adapted to generate electricity when driven by the gas turbine engine,
   an energy storage unit coupled to the generator and configured to store the electricity generated by the generator, and
   a generator control system configured to selectively operate the starter and to selectively deliver fuel to the combustor such that the first shaft is continuously rotated by at least one of the starter and high pressure gasses from the combustor and the second shaft is selectively rotated by high pressure gasses from the combustor,
   wherein fuel is selectively delivered to the combustor when a power demand signal of the high-energy beam unit is received by the generator control system, and
   wherein fuel is selectively cut from the combustor when no power demand signal of the high-energy beam unit is received by the generator control system while the first shaft continues to be rotated by the starter in order to maintain a rapid-start mode of the weapon system platform.

2. The system platform of claim 1, wherein fuel is selectively delivered to the combustor when an amount of electricity stored in the energy storage unit is below a threshold level.

3. A weapon system platform comprising:
   a high-energy beam unit configured to discharge high-energy beams,
   a gas turbine engine configured to provide power for the high-energy beam unit, the gas turbine engine including a first shaft coupled to a compressor and a high pressure turbine rotor, a second shaft concentric with and independently rotatable relative to the first shaft and coupled to a low pressure turbine rotor, a starter adapted to rotate the first shaft, and a combustor adapted to combine air received from the compressor with fuel and to burn the fuel to supply high pressure gasses toward the high pressure turbine rotor and low pressure turbine rotor to rotate the first and second shafts,
   a generator coupled to the second shaft of the gas turbine engine and adapted to generate electricity when driven by the gas turbine engine,
   an energy storage unit coupled to the generator and configured to store the electricity generated by the generator,
   a generator control system configured to selectively operate the starter and to selectively deliver fuel to the combustor such that the first shaft is continuously rotated by at least one of the starter and high pressure gasses from the combustor and the second shaft is selectively rotated by high pressure gasses from the combustor,
   a load shaft gearbox coupled to the second shaft and the generator, wherein the load shaft gearbox is configured to transfer rotation of the second shaft to the generator, and
   an accessory gearbox engaged with the first shaft through a bevel gear and engaged with the starter such that the accessory gearbox is continuously driven by at least one of the starter and the first shaft to power one or more engine accessories;
   wherein fuel is selectively delivered to the combustor when a power demand signal of the high-energy beam unit is received by the generator control system, and
   wherein fuel is selectively cut from the combustor when no power demand signal of the high-energy beam unit is received by the generator control system while the first shaft continues to be rotated by the starter in order to maintain a rapid-start mode of the weapon system platform.

4. The weapon system platform of claim 3, wherein the energy storage unit is a high power energy storage unit configured to power the high-energy beam unit, and wherein the generator is a high power generator configured to produce electricity to charge the high power energy storage unit during operation of the high-energy beam unit.

5. The weapon system platform of claim 4, wherein fuel is selectively delivered to the combustor when the high-energy beam unit is operated.

6. The weapon system platform of claim 4, further comprising a low power generator coupled to the load shaft gearbox and configured to generate electricity when driven by the gas turbine engine, and a low power energy storage unit coupled to the low power generator and configured to store the electricity generated by the low power generator.

7. The weapon system platform of claim 6, wherein the starter is electrically connected to the low power energy storage unit.

8. A weapon system platform comprising:
   a high-energy beam unit configured to discharge high-energy beams,
   a gas turbine engine configured to provide power for the high-energy beam unit, the gas turbine engine including a first shaft coupled to a compressor and a high pressure turbine rotor, a second shaft concentric with and independently rotatable relative to the first shaft and coupled to a low pressure turbine rotor, a starter adapted to rotate the first shaft, and a combustor adapted to combine air received from the compressor with fuel and to burn the fuel to supply high pressure gasses toward the high pressure turbine rotor and low pressure turbine rotor to rotate the first and second shafts,
   a generator coupled to the second shaft of the gas turbine engine and adapted to generate electricity when driven by the gas turbine engine,
   an energy storage unit coupled to the generator and configured to store the electricity generated by the generator, and
   a generator control system configured to selectively deliver fuel to the combustor when an amount of electricity stored in the energy storage unit is below a threshold level and selectively cut fuel from the combustor when the amount of electricity stored in the energy storage unit is above the threshold level and to selectively operate the starter such that the first shaft is continuously rotated by the starter when the amount of electricity stored in the energy storage unit is above the threshold level to allow the gas turbine engine to rapidly start with a re-application of fuel.

\* \* \* \* \*